US012702945B2

(12) United States Patent
Al-Khairy

(10) Patent No.: US 12,702,945 B2
(45) Date of Patent: Aug. 11, 2026

(54) IMPENDING BYPASS INDICATOR

(71) Applicant: PRATT & WHITNEY CANADA CORP., Longueuil (CA)

(72) Inventor: Issam Al-Khairy, Verdun (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/967,959

(22) Filed: Dec. 4, 2024

(65) Prior Publication Data

US 2026/0151720 A1 Jun. 4, 2026

(51) Int. Cl.
*B01D 46/00* (2022.01)

(52) U.S. Cl.
CPC ..... *B01D 46/0086* (2013.01); *B01D 46/0087* (2013.01)

(58) Field of Classification Search
CPC .......................... B01D 35/147; B01D 35/1475; B01D 35/143; F16K 37/00; Y10T 137/8326; F01D 17/105; F01D 17/08
See application file for complete search history.

(56) References Cited

U.S. PATENT DOCUMENTS

| | | | | |
|---|---|---|---|---|
| 3,323,649 A * | 6/1967 | Rosaen | B01D 35/147 210/243 |
| 4,423,751 A * | 1/1984 | Roettgen | F16K 17/0413 210/90 |
| 4,792,651 A * | 12/1988 | Whiting | B01D 35/143 73/745 |
| 10,378,443 B2 | 8/2019 | Clark et al. | |
| 2015/0128906 A1* | 5/2015 | Futa | B01D 27/103 123/445 |
| 2018/0216530 A1* | 8/2018 | Clark | F01D 17/105 |
| 2021/0254518 A1 | 8/2021 | Poster | |
| 2022/0401859 A1 | 12/2022 | Al-Khairy | |

FOREIGN PATENT DOCUMENTS

CN 116272104 A 6/2023

OTHER PUBLICATIONS

European Search report issue in counterpart EP application No. 25220526.5 on Mar. 5, 2026.

* cited by examiner

*Primary Examiner* — Mirza F Alam
(74) *Attorney, Agent, or Firm* — NORTON ROSE FULBRIGHT CANADA LLP

(57) ABSTRACT

An impending bypass indicator (IBI) includes a housing having a fluid inlet for admitting a fluid into an interior of the housing, and a piston displaceable in the interior of the housing in response to a pressure variation of the fluid in the interior, the piston displaceable between a first position and a second position spaced apart from the first position. A piston magnet is coupled to the piston. An indicator indicates an impending bypass of a component in response to the piston being in the second position. A housing magnet engages the piston magnet in the second position and generates a magnetic force acting on the piston magnet. A biasing element biases the piston towards the first position with a biasing force inferior to the magnetic force. An electromagnetic coil adjacent the housing magnet is selectively electrifiable to generate a second magnetic force opposite to the magnetic force.

19 Claims, 5 Drawing Sheets

IMPENDING BYPASS INDICATOR

TECHNICAL FIELD

The application relates generally to fluid bypass devices and, more particularly, to impending bypass indicators.

BACKGROUND

Impending bypass switches (IBS) and impending bypass indicators (IBI) are devices used to signal or warn of a forthcoming, or "impending", bypass of a fluidly-connected component, such as a filter, in response to variations in fluid pressure. Some IBS use moving components or electronic components which may be subject to wear, or which may experience vibrations when the IBS is operating. These factors may cause the IBS to emit signals warning of an impending bypass which are false.

SUMMARY

There is accordingly provided an impending bypass indicator (IBI), comprising: a housing having a fluid inlet for admitting a fluid into an interior of the housing; a piston displaceable in the interior of the housing in response to a pressure variation of the fluid in the interior, the piston displaceable between a first position and a second position spaced apart from the first position, a piston magnet coupled to the piston; an indicator indicating an impending bypass of a component in response to the piston being in the second position; a housing magnet in the housing, the housing magnet engaging the piston magnet in the second position of the piston, the housing magnet generating a magnetic force acting on the piston magnet; a biasing element biasing the piston towards the first position with a biasing force inferior to the magnetic force; and an electromagnetic coil disposed adjacent the housing magnet, the electromagnetic coil selectively electrifiable to generate a second magnetic force opposite to the magnetic force imparted by the housing magnet to allow the biasing element to bias the piston towards the first position.

In certain embodiments, the impending bypass indicator as defined above includes one or more of the following features, in whole or in part, and in any combination.

In certain aspects, an additional housing magnet in the housing, the additional housing magnet engaging the piston magnet in the first position of the piston, the additional housing magnet generating an additional magnetic force acting on the piston magnet to retain the piston in the first position until the pressure variation of the fluid in the interior increases to a magnitude indicative of the impending bypass of the component.

In certain aspects, a magnetic sensor configured to receive a current and fixedly mounted to the housing, and an indicator magnet mounted to the piston to be displaced with the piston, displacement of the indicator magnet relative to the magnetic sensor causing a change in the current through the magnetic sensor, the change in the current indicative of the impending bypass of the component.

In certain aspects, the magnetic sensor is a Hall effect sensor.

In certain aspects, the magnetic sensor is a magnetoresistive sensor.

In certain aspects, the housing further includes a fluid outlet for evacuating the fluid from the interior of the housing to bypass the component.

In certain aspects, a visual indicator including a display through the housing and a visual indication coupled to and displaceable with the piston, the visual indication positioned in the display upon the piston displacing to the second position to visually indicate the impending bypass of the component.

In certain aspects, the housing includes a diaphragm fluidly sealing a wet portion of the interior from a dry portion, the diaphragm engaging the piston to displace the piston in response to the pressure variation of the fluid.

In certain aspects, the biasing element is a spring and the biasing force is a spring force biasing the piston towards the first position.

There is also provided a fluid filter system, comprising: a fluid line for conveying a fluid under pressure to a fluid filter; an impending bypass indicator (IBI), comprising: a housing having a fluid inlet for admitting a fluid into an interior of the housing; a piston displaceable in the interior of the housing in response to a pressure variation of the fluid in the interior, the piston displaceable between a first position and a second position spaced apart from the first position, a piston magnet coupled to the piston; an indicator indicating an impending bypass of the fluid filter in response to the piston being in the second position; a housing magnet in the housing, the housing magnet engaging the piston magnet in the second position of the piston, the housing magnet generating a magnetic force acting on the piston magnet; a biasing element biasing the piston towards the first position with a biasing force inferior to the magnetic force; and an electromagnetic coil disposed adjacent the housing magnet, the electromagnetic coil selectively electrifiable to generate a second magnetic force opposite to the magnetic force imparted by the housing magnet to allow the biasing element to bias the piston towards the first position.

In certain embodiments, the fluid filter system as defined above includes one or more of the following features, in whole or in part, and in any combination.

In certain aspects, there is included an additional housing magnet in the housing, the additional housing magnet engaging the piston magnet in the first position of the piston, the additional housing magnet generating an additional magnetic force acting on the piston magnet to retain the piston in the first position until the pressure variation of the fluid in the interior increases to a magnitude indicative of the impending bypass of the fluid filter.

In certain aspects, the indicator includes a magnetic sensor configured to receive a current and fixedly mounted to the housing, and an indicator magnet mounted to the piston to be displaced with the piston, displacement of the indicator magnet relative to the magnetic sensor causing a change in the current through the magnetic sensor, the change in the current indicative of the impending bypass of the fluid filter.

In certain aspects, the magnetic sensor is a Hall effect sensor.

In certain aspects, the magnetic sensor is a magnetoresistive sensor.

In certain aspects, the housing further includes a fluid outlet for evacuating the fluid from the interior of the housing to bypass the fluid filter.

In certain aspects, the indicator includes a visual indicator including a display through the housing and a visual indication coupled to and displaceable with the piston, the visual indication positioned in the display upon the piston displacing to the second position to visually indicate the impending bypass of the fluid filter.

In certain aspects, the housing includes a diaphragm fluidly sealing a wet portion of the interior from a dry portion, the diaphragm engaging the piston to displace the piston in response to the pressure variation of the fluid.

In certain aspects, the biasing element is a spring and the biasing force is a spring force biasing the piston towards the first position.

In certain aspects, a bypass line in the fluid line, the bypass line including a valve, the valve actuated upon receipt of a bypass signal from the IBI indicative of the impending bypass of the fluid filter to create a bypass of the fluid filter in the fluid line.

There is further provided a method of signalling an impending bypass of a filter, the method comprising: activating a impending bypass indicator (IBI) by releasing a piston in the IBI from an inactive position, said activating including electrifying a magnetic coil in the IBI to oppose a magnet retaining the piston in the inactive position; biasing the piston from the inactive position to an active position; flowing a fluid into an interior of the IBI, the piston displacing towards the inactive position due to fluid pressure build up caused by a blockage of the filter; and emitting a signal indicative of the impending bypass of the filter in response to the piston reaching the inactive position.

BRIEF DESCRIPTION OF THE DRAWINGS

Reference is now made to the accompanying figures in which.

DETAILED DESCRIPTION

Figure 1:
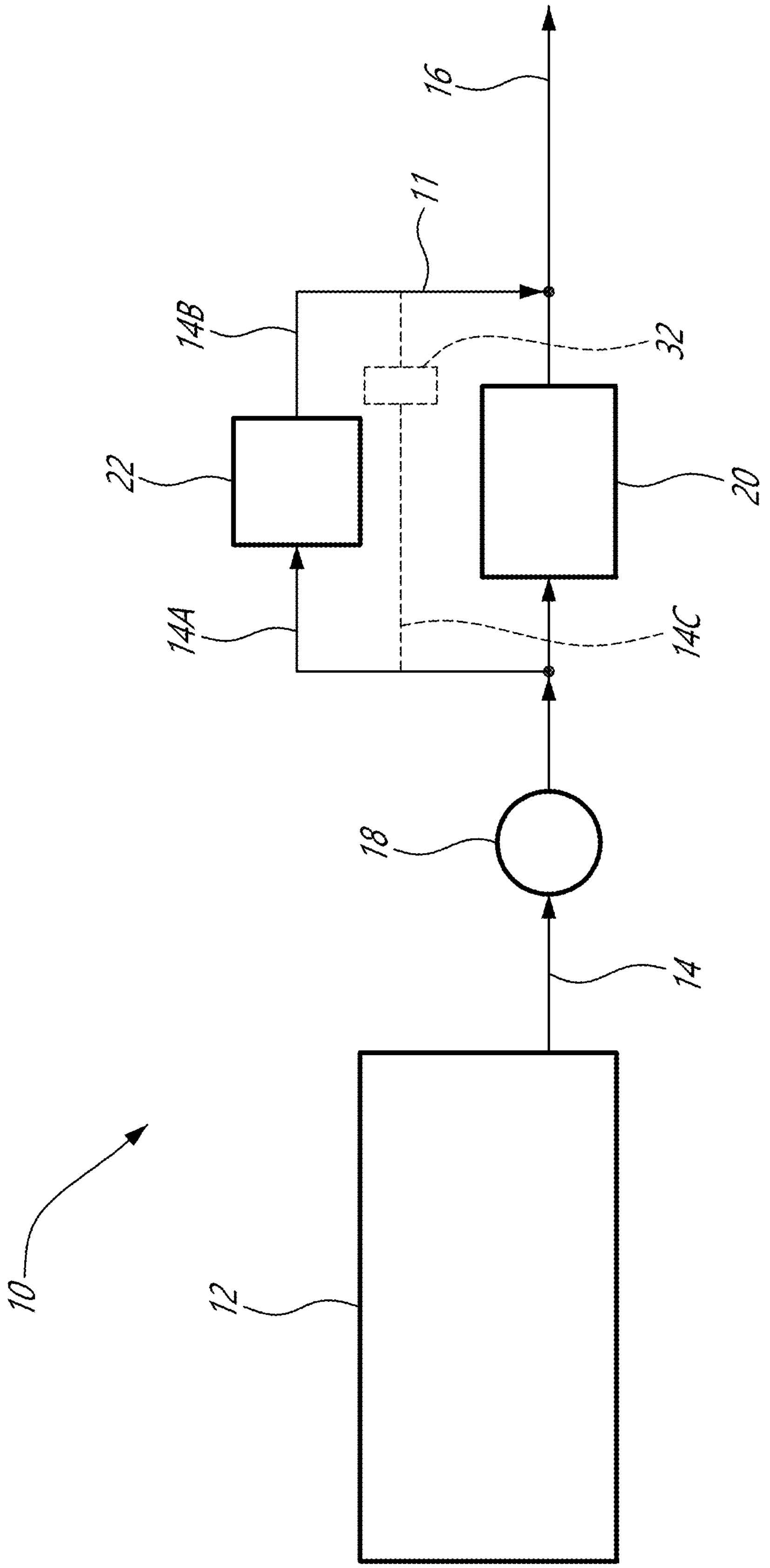
FIG. 1 is a schematic, partial cross-sectional view showing a possible configuration for a fluid filter system having an impending bypass switch.

FIG. 1 illustrates a fluid filter system 10 of a type for use in an aircraft engine or power plant, although the use of the fluid filter system 10 is possible in other machines or components. The fluid filter system 10 conveys a fluid 11 under pressure from one area of the engine to another area of the engine. The fluid 11, illustratively stored in an fluid reservoir 12, is conveyed through one or more fluid lines 14 towards a fluid line outlet 16, for instance towards other engine components. The fluid 11 is pressurized in the fluid line 12 by a pump 18. The pump 18 in FIG. 1 is shown as part of the fluid line 14 to convey the fluid 11 under pressure through the fluid line inlet 14 from the fluid reservoir 12 to the fluid line outlet 16.

The fluid 11 is filtered before and/or after being used. The fluid filter system 10 thus includes a filter 20 between the fluid reservoir 12 and the fluid line outlet 16. The fluid 11 is conveyed under pressure through filter 20. The filter 20 removes matter or debris from the fluid 11 before the fluid 11 is conveyed downstream from the filter 20 through the fluid line outlet 16.

The fluid 11 may be any fluid used in the engine. For example, in one possible configuration, the fluid 11 is aircraft fuel and the fluid filter system 10 is part of an aircraft fuel system. The fuel is conveyed from a fuel tank (i.e., reservoir 12) in fluid communication with the fluid line 14. The fuel flows through the filter 20 which removes matter or debris from the fuel before it is it is conveyed through the fluid line outlet 16 to a fuel nozzle to be combusted. In another possible configuration, the fluid 11 is a lubricating fluid, such as oil, and the fluid filter system 10 is part of an oil system. The oil is conveyed from an oil reservoir (i.e., reservoir 12), or from components that have been lubricated by the oil, which are in fluid communication with the fluid line 14. The oil flows through the filter 20 which removes matter or debris from the oil before it is it is conveyed through the fluid line outlet 16 to lubricate another component, or to return to an oil reservoir. Other types of fluids 11 may be used with the fluid filter system 10 disclosed herein.

During operation of the fluid filter system 10, it may occur that the filter 20 becomes partially or fully blocked by matter or debris. The fluid filter system 10 may thus include another component to warn or alert that the filter 20 is blocked, and/or to advise of a forthcoming blockage of the filter 20.

Referring to FIG. 1, the fluid filter system 10 includes an impending bypass indicator 22. The impending bypass indicator 22 (sometimes referred to herein as the "IBI 22") is downstream of the pump 18, and is in fluid communication with the fluid line 14 to receive the fluid 11. The IBI 22 may be upstream of the filter 20, or parallel with the filter 20 (as in FIG. 1). As will be explained in greater detail below, the IBI 22 is responsive to blockages or malfunctions of the filter 20. These blockages or malfunctions may require the fluid 11 to be diverted, or to "bypass", the filter 20 in order to maintain operation of the components downstream of the fluid line outlet 16. The IBI 22 alerts or warns of an upcoming, or "impending", bypass of the filter 20. This alert or warning from the IBI 22 may be received by an engine operator or technician, so that they are made aware of a problematic blockage or malfunction of the filter 20, and so that they may perform corrective maintenance, repair or replacement of the filter 20. Thus, in FIG. 1, the IBI 22 is a "fluid-filter" IBI because it is used to warn of an impending bypass of the filter 20. In other possible configurations, the IBI 22 is used to warn of an impending bypass of another engine component, such as a valve, caused by a blockage or malfunction of the other engine component. The IBI 22 may thus be used to warn of an impending bypass of other engine components as well. Different possibilities for diverting the fluid 11 around the filter 20 are within the present disclosure. For example, the bypass of the filter 20 is performed by the IBI 22. In other cases, an additional bypass device may be provided.

Figure 2:
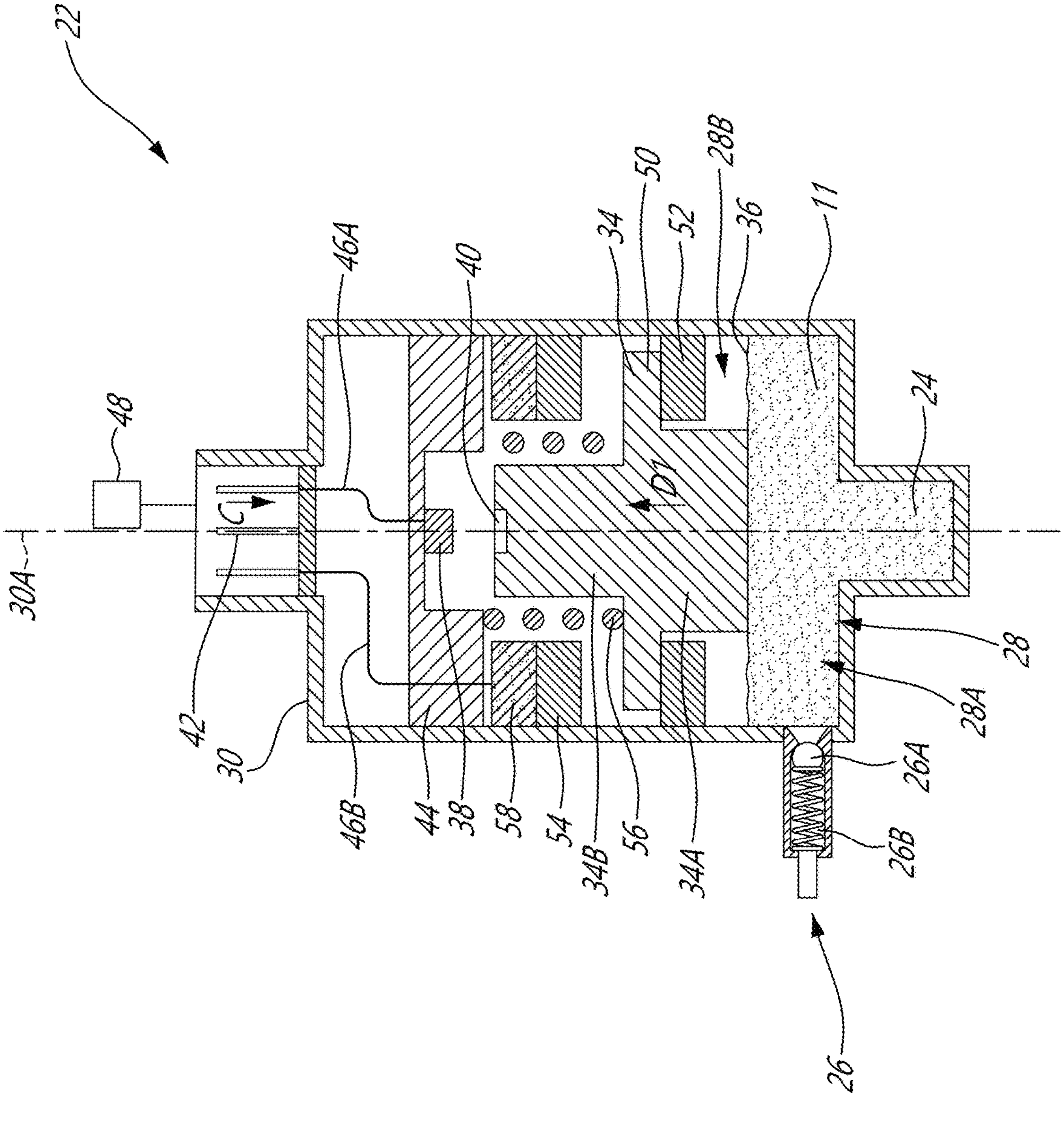
FIG. 2 is schematic, partial cross-sectional view showing the impending bypass switch for the fluid filter system of FIG. 1, according to an embodiment.

Referring now to FIG. 2, an embodiment of an IBI 22 is shown. The IBI 22 has a fluid inlet 24 in fluid communication with a bypass fluid line inlet 14A to receive the fluid 11. The fluid inlet 24 and the IBI 22 are mounted in parallel to the filter 20, so that the IBI 22 receives the fluid 11 at the same pressure at which the filter 20 receives the fluid 11. The IBI 22 has a fluid outlet 26 that is part of, or in fluid communication with, the fluid line outlet 16. Referring to FIGS. 1 and 2, the fluid outlet 26 is in fluid communication with a bypass fluid line outlet 14B which extends from the fluid outlet 26 to the fluid line outlet 16, in order to convey the fluid 11 from the fluid outlet 26 to the fluid line outlet 16 and thus bypass the filter 20. In other cases, the fluid outlet 26 is omitted, as discussed in further detail below.

The IBI 22 has an interior 28 for admitting the fluid 11 received from the bypass fluid line inlet 14A via the fluid inlet 24. The interior 28 is a sealed or impermeable internal volume of the IBI 22 which is in fluid communication with the fluid inlet 24 and/or with the fluid outlet 26. The fluid outlet 26 is in fluid communication with the interior 28 of the IBI 22, and is also in fluid communication with the fluid inlet 24 when the IBI 22 is performing the bypass of the filter 20, as explained in greater detail below. The fluid outlet 26 is thus downstream of the pump 18, and is used to convey the fluid 11 from the interior 28 to downstream of the filter 20 in a bypass situation.

The fluid inlet 24 and the fluid outlet 26 are defined in a housing 30 of the IBI 22. The housing 30 is a structure or body which forms the corpus of the IBI 22 and provides structure thereto. The housing 30 is partially or completely hollow, and defines the interior 28. In an embodiment, the fluid inlet and outlet 24, 26 are ports formed in walls of the housing 30. In the configuration shown in FIG. 2, the IBI 22 is thus a device which both warns of an impending bypass of the filter 20, and also allows for the fluid 11 to bypass the filter 20 in the event of a blockage or malfunction of the filter 20. In the shown case, the fluid outlet 26 includes a ball 26*a* and spring 26*b* arrangement, and is configured to open once the pressure of the fluid 11 in the interior 28 reaches a level indicative of an impending bypass of the filter 20. Other fluid outlet 26 configurations, for instance an electronically-controlled fluid outlet 26 or a fluid outlet 26 which allow the fluid 11 to flow into the interior 28 via the fluid outlet 26, may be contemplated. In other cases, the fluid outlet 26 is omitted. For instance, in the embodiment shown in FIG. 3, the IBI 22' is configured to warn of an impending bypass of the filter 20, while the actual bypassing is carried out by a separate component.

In another possible configuration of the IBI 22, the bypass of the filter 20 is performed away from, or outside of, the IBI 22. For example, and referring to FIG. 1, an alternative bypass line 14C extends in parallel to the IBI 22. An inlet to the bypass line 14C is upstream of the fluid inlet 24, and an outlet of the bypass line 14C is downstream of the filter 20. The bypass line 14C may have a valve 32 downstream of the inlet to the bypass line 14C. The valve 32 may be configured to open and to allow the fluid 11 to flow through the bypass line 14C so as to bypass the filter 20 when the pressure of the fluid 11 exceeds a set pressure of the valve 32. In such a configuration where the bypass of the filter 20 is performed outside of the IBI 22, the IBI 22 is free of a fluid outlet 26 (see FIG. 3, for instance). In such a configuration where the bypass of the filter 20 is performed outside of the IBI 22, the IBI 22 is free of a fluid outlet 26 that is in fluid communication with the fluid line outlet 14B. The IBI 22 may therefore, in some embodiments, have only the fluid inlet 24.

Referring to FIG. 2, the IBI 22 has a piston 34. The piston 34 is positioned within the interior 28 of the housing 30. The housing 30 may thus be referred to as a "piston housing" or a "plunger housing". The piston 34 is displaceable relative to the housing 30. The piston 34 is displaceable within the interior 28 of the housing 30. In the configuration shown, the housing 30 is a cylindrical body which extends along a longitudinal axis 30A. The piston 34 is a body that translates in a linear direction that is parallel to the longitudinal axis 30A. The piston 34 is displaceable in response to a build up of pressure within the interior 28 of the IBI 22. For example, and referring to FIGS. 1 and 2, the fluid 11 is pumped into the interior 28 via the fluid line 14 and via the bypass fluid line inlet 14A. As less of the fluid 11 is conveyed through the filter 20 because of blockage or malfunction, more of the fluid 11 accumulates in the interior 28 and changes the pressure acting against piston 34. This increased pressure causes the piston 34 to displace in a direction D1 parallel to the longitudinal axis 30A.

The piston 34 may have any configuration or take any form to achieve the functionality ascribed to it herein. For example, and referring to FIG. 2, the piston 34 includes a piston head 34A or plunger mounted to a piston rod 34B. The piston head 34A and the piston rod 34B are fixedly mounted to each other and displace together as a single-unit relative to the housing 30. The piston rod 34B extends perpendicularly from the piston head 34A along a direction that is parallel to the longitudinal axis 30A, and that is parallel to the direction D1 of displacement of the piston 34. A diaphragm 36 extends across the interior 28 of the housing 30 in a direction transverse to the longitudinal axis 30A. The diaphragm 36 is disposed between the fluid inlet 24 and the piston 34 and acts as a seal within the interior 28. In particular, the diaphragm 36 creates a barrier within the interior 28 to prevent the passage of the fluid 11 therethrough. The diaphragm 36 is flexible and thus is displaceable relative to the housing 30 in response to a pressure variation of the fluid 11 within the interior 28. The diaphragm 36 therefore divides (or fluidly seals) the interior 28 into a wet portion 28A that can receive the fluid 11 and be exposed thereto, and a dry portion 28B that is not exposed to the fluid 11.

The diaphragm 36 is thus configured for allowing the fluid to exert pressure against the piston head 34A. The fluid 11 is thus largely prevented from flowing through, or past, the piston head 34A by the diaphragm 36, such that the build up of the fluid 11 in the interior 28 via the fluid inlet 24 will exert pressure on the piston head 34A and cause the piston 34 to displace relative to the housing 30. It is understood that, during normal or unblocked operation of the filter 20, the fluid 11 may also enter the interior 28 via the fluid outlet 26 by flowing upstream through the bypass fluid line outlet 14B. It therefore follows that it is the pressure differential across the piston head 34A (i.e. the difference in fluid pressure on one side of the piston head 34A versus the other side) which causes the piston head 34A and the piston rod 34B to translate. The piston 34 and/or the piston head 34A may be calibrated to displace in response to a predetermined pressure differential that is representative of a defined blockage of the filter 20, for example. The piston 34 may have other forms, and may sometimes be referred to as a "plunger". Thus the term "piston" should be understood as covering other devices in the IBI 22 that are responsive to changes in fluid pressure.

In the embodiment shown in FIG. 2, the IBI 22 is configured to signal the impending bypass of the filter 20 as a result of electromagnetic components of the IBI 22. The IBI 22 shown in FIG. 2 includes a magnetic sensor 38 and one or more magnets 40, collectively referred to as a magnetic indicator. Other indicators for the IBI 22 may be contemplated, such as a visual indicator, as discussed in further detail below. The magnetic sensor 38 and magnet(s) 40 are disposed in the dry portion 28B of the interior 28 and thus not exposed directly to the fluid 11. In the shown case, a mounting plate 44 is disposed in the housing 30 for receiving the magnetic sensor 38. The magnetic sensor 38 is a device through which an electric current C flows during operation of the IBI 22. Illustratively, current C is provided via electrical connector 42 and wire(s) 46A. The current C flowing through the magnetic sensor 38 responds to, or is changed by, a magnetic field generated by the magnets 40. The change in the current C through the magnetic sensor 38 may be detected or measured, and used to signal an impending bypass of the filter 20, as explained in greater detail below. Different types of magnetic sensors 38 may be used to achieve the functionality described herein, and are within the scope of the present disclosure.

Various types of magnetic sensors 38 may be contemplated. In an embodiment, the magnetic sensor 38 is or includes a Hall effect sensor. The electric current C flows through a Hall element, for instance a semiconductor element. As the magnet 40 is brought nearer to the Hall element, the magnetic field of the magnet 40 exerts a force on the Hall element which deflects the charge carriers to the sides of the Hall element. This movement of charge carriers generates a potential difference and a measurable voltage called the Hall voltage. The detection of the Hall voltage, or the Hall voltage exceeding a predetermined value, may be measured or monitored to signal an impending bypass of the filter 20. In the Hall effect sensor, the magnet 40 is displaced relative to the Hall element along a direction that is perpendicular to a plane defined by the Hall element.

In another embodiment, the magnetic sensor 38 is or includes a magnetoresistive (MR) sensor 23B. As with the Hall effect sensor, the current C through the MR sensor responds to changes in the external magnetic field generated by the magnet 40. The electric current C flows through a sensor element, for instance a film. As the magnet 40 is brought nearer to the sensor element, the magnetic field of the magnet 40 exerts a force on the sensor element 38 which changes its resistance. The change in resistance generates a varying current. The detection of this varying current, or the varying current exceeding a predetermined value, may be used to signal an impending bypass of the filter 20. The magnet 40 is displaced relative to the sensor element 23BH along a direction that is parallel to a plane defined by the sensor element. Some types of MR sensors that may be used include, but are not limited to, Anisotropic Magnet Resistance (AMR) sensors and giant magnetoresistance (GMR) sensors. Other types magnetic sensors 38 may be contemplated. In addition, a non-magnetic sensor may be contemplated, as discussed in further detail below.

In the shown case, the magnetic sensor 38 and the magnet 40 are displaceable relative to each other. The magnetic sensor 38 and the magnet 40 translate relative to each other in a direction parallel to the longitudinal axis 30A to allow the IBI 22 to signal an impending bypass. This relative displacement may take different configurations. For example, and referring to FIG. 2, the magnetic sensor 38 is fixedly mounted to the housing 30 via mounting plate 44 and the one or more magnets 40 are mounted to the piston 34 to be displaced with the piston 34 relative to the housing 30. By "fixedly mounted", it is understood that the magnetic sensor 38 does not displace when the IBI 22 is operating. By "fixedly mounted", it is understood that the magnetic sensor 38 does not displace relative to the housing 30. Different configurations for fixedly mounting the magnetic sensor 38 to the housing 30 may be contemplated.

In an alternate embodiment, the magnetic sensor 38 is mounted to the piston 34 to be displaced therewith, and the magnet 40 is fixedly mounted to the housing 30. It will thus be appreciated that the magnet 40 may be mounted to one of the piston 34 and the housing 30, and that the magnetic sensor 38 may be mounted to the other of the housing 30 and the piston 34, provided that there is relative displacement between the magnet 40 and the magnetic sensor 38. In the embodiment where the magnetic sensor 38 is mounted to the moving piston 34, the magnetic sensor 38 is a moving magnetic flux sensor whose wiring may need to be reinforced in order to reduce damage or wear caused by vibrations.

In the shown case, the magnetic sensor 38 is thus a "solid state" sensor because it does not contain any moving parts and because it does not move relative to the housing 30. In particular, the magnetic sensor 38 is a "solid state" magnetic flux sensor that responds to changes in the magnetic flux from the magnet 40. More particularly, the current C flowing through the magnetic sensor 38 changes in response to changes in the magnetic flux of the magnet 40. This in contrast with some mechanisms known as "Reed switches" or micro-limit switches, which may also be contemplated for magnetic sensor 38. For instance, a Reed switch may be provided, in which a pair of ferromagnetic metal contacts in a sealed chamber are displaced toward each other to form a circuit when a magnetic field is present.

The ability of the magnet 40 and the magnetic sensor 38 to be positioned in close proximity to each other allows for the displacement of the magnet 40 relative to the magnetic sensor 38 to change the electrical current C flowing through the magnetic sensor 38. By "change" the electric current C, it is understood that the current flowing constantly through the magnetic sensor 40 is altered by the magnetic field from the magnet 40 as the magnet 40 is displaced relative to the magnetic sensor 38, in such a manner as to allow the IBI 22 to signal an impending bypass of the filter 20. This change in the electric current may be achieved in different ways. For example, in the embodiment where the magnetic sensor 38 is a Hall effect sensor, the magnetic field of the magnet 40 exerts a force on the Hall element which deflects the charge carriers to the sides of the Hall element. This movement of charge carriers generates a potential difference and a measurable voltage called the Hall voltage. In another example, in the embodiment where the magnetic sensor 38 is an MR sensor, the magnetic field of the magnet 40 exerts a force on the sensor element which changes its resistance. The change in resistance generates a varying current.

The change in the current C can be detected, measured and/or processed to cause the IBI 22 to emit an impending bypass signal. The impending bypass signal is representative of a change in the current C flow through the magnetic sensor 38, and the impending bypass signal may be processed or analysed to alert an engine control system or a human operator or a technician that a bypass of the filter 20 may soon occur.

Still referring to FIG. 2, the IBI 22 includes a controller 48. The controller 48 measures or detects the change in current C through the magnetic sensor 38, and emits the impending bypass signal. The controller 48 may thus be a component of the IBI 22, or may be separate therefrom. By way of an example, the controller 48 may be positioned in the interior 28 away from moving parts of the housing 30 and isolated from the fluid 11, to receive input (i.e. the change in the current C) from the magnetic sensor 38, which may be communicatively coupled to the controller 48 in any suitable fashion. The controller 48 may receive instructions from an operator via the remote device, or may be operated on the basis of commands stored within or otherwise provided to the remote device. The controller 48 then processes the change in the current C in accordance with the commands.

The IBI 22 disclosed herein thus relies on a pressure differential across a piston 34 and magnet assembly 38, 40 so that movement of the magnet 40 is detected by the magnetic sensor 38 that is spaced apart from the magnet 40, due to the effect of the magnet 40 on the electrical circuit characteristics of the magnetic sensor 38, thereby indicating an impending bypass. In embodiments, the presence of the solid state magnetic sensor 38 fixedly mounted to the housing 30 results in a no-moving part, no-contact detection assembly, which is thus less susceptible to wear or malfunction caused by vibrations. The effect of engine vibrations and low circuit currents on the magnetic sensor 38 may thus be reduced or eliminated, leading to an increased part life, lower costs, and lower complexity.

Different configurations of the magnet 40 are possible to achieve this functionality and to allow the IBI 22 to emit the impending bypass signal. For example, and referring to FIG. 2, the piston 34 is displaceable between an initial or first position and a second position spaced apart from the initial position. The initial position of the piston 34 represents normal operation of the filter 20, in which the filter 20 is unblocked and allows the fluid 11 to flow through. This initial position may be a default position of the magnet 40. The piston 34 in the second position is spaced apart from the piston 34 in the initial position along a direction parallel to the longitudinal axis 30A. The piston 34 has been displaced from the initial position to the second position by the build up of fluid pressure in the wet portion 28A of the housing 30 caused by blockage of the filter 20. This pressure build up creates a pressure differential across the piston head 34A, causing it to displace in the direction D1 and consequently displace the magnet 40. The second position of the piston 34 is thus representative of an impending bypass of the filter 20. Various components are provided for retaining and guiding the piston 34 through its various positions, as will be discussed in further detail below.

The piston 34 is shown in FIG. 2 in its initial position, also referred to as a first position. In the initial position of the piston 34, the magnet 40 is positioned at a far enough distance from the magnetic sensor 38 such that it does not impart an effect on the current C through the magnetic sensor 38. As the filter 20 becomes blocked or malfunctions, the pressure build up of the fluid 11 in the wet portion 28A will cause the piston head 34A to displace in the direction D1. This will also displace the magnet 40 in the direction D1 to the second position that is indicative of an impending bypass. In the second position of the piston 34, the magnet 40 approaches the magnetic sensor 38 and imparts an effect on the current C through the magnetic sensor 38. This effect is indicative of an impending bypass of the filter 20, and the controller 48 may be programmed to recognise this change in the current C as being representative of an impending bypass of the filter 20, such that the impending bypass signal is emitted. Other arrangements between magnetic sensor 38 and magnet 40 may be contemplated.

Still referring to FIG. 2, the IBI 22 includes additional components guiding the displacement of the piston head 34A between the first and second positions. The piston head 34A includes a piston magnet 50. In some cases, the piston magnet 50 is received by or coupled to the piston head 34A. In other cases, the piston head 34A is at least partially formed of a magnetic material such that the piston magnet 50 is integrated with the piston 34. The piston head 34A is engageable with other magnets within the housing 30 to be retained in the various positions. In particular, a first housing magnet 52 in the housing 30 is positioned so as to engage the piston magnet 50 in the first position of the piston head 34A, and a second piston magnet 54 in the housing 30 is positioned so as to engage the piston magnet 50 in the second position of the piston head 34A. The second housing magnet 54 imparts a magnetic force, also referred to as an attractive force, towards the piston magnet 54. A biasing element 56, illustratively a spring 56, is configured to bias the piston head 34A towards the its first position. The biasing element 56 exerts a biasing force (e.g., a spring force) against the piston head 34A that is inferior to the magnetic force of the second housing magnet 54. As such, when the piston head 34A is in the second position, the second housing magnet 54 is configured to overcome the biasing force of the biasing element 56 to retain the piston head 34A in its second position. This is referred to as a de-activated condition of the IBI 22. As such, once the piston head 34A is in its second position, indicative of an impending bypass of the filter 20, a positive action is required to displace the piston head 34A towards the first position for the IBI to be in an activated or ready condition. In embodiments, the biasing element 56 is tuned or calibrate so that the piston 34 will displace in response to a predetermined pressure differential that is representative of a defined blockage of the filter 20.

Still referring to FIG. 2, the IBI 22 further includes an electromagnetic coil 58 disposed adjacent to the second housing magnet 54. The coil 58 is activatable, or electrifiable, for instance via controller 48, electrical connector 42 and wire(s) 46B. Once electrified, the electromagnetic coil 58 is configured for generating a magnetic field that is substantially equal but opposite to the magnitude and direction magnetic force generated by the second housing magnet 54. Stated differently, the electromagnetic coil 58 is configured to neutralize the magnetric force of the second housing magnet 54 acting towards the piston magnet 50, thereby allowing the biasing element 56 to bias the piston head 34A from the second position to the first position. In the first position, the piston head 34A is retained by the first housing magnet 52 until pressure due to the fluid 11 in the wet portion 28B is sufficient to overcome both the biasing force of the biasing element 56 and a magnetic force of the first housing magnet 52 acting towards the piston magnet 50 to bias the piston head 34A towards the second position (i.e., in the case of an impending bypass of the filter 20). In some cases, the electromagnetic coil 58 is controlled via the controller 48 to automatically engage or disengage, for instance based on a status of the filter 20. In other cases, the electromagnetic coil 58 is manually controllable, for instance via a user interface connected to the controller 48 or directly. The IBI 22 is thus said to be remotely resettable, as the provision of current to the electromagnetic coil 58 will reset or revert the IBI 22 from its triggered or activated state to a non-activated or ready state.

In an embodiment, the first housing magnet 52 is omitted. In this case, the biasing force imparted by the biasing element 56 against the piston head 34A is tuned to apply a predetermined degree of resistance to the fluid pressure of the fluid in the wet portion 28A so that only the predetermined fluid pressure indicative of an impending bypass of the filter 20 is sufficient to displace the piston head 34A towards the second position.

One possible operation of IBI 22 is now described in greater detail with reference to FIGS. 1 and 2. During normal, unblocked operation of the filter 20, the fluid 11 is pumped by the pump 18 through the fluid line 14 to the filter 20, and to the wet portion 28A of the interior 28 of the IBI 22 via the fluid inlet 24. Since the filter 20 is functioning normally, the fluid 11 continues to flow through the filter 20 and is prevented from increasing the fluid pressure in the wet portion 28A high enough to cause displacement of the piston head 34A in the direction D1. The magnet 40 will thus remain in its initial or default position, and the controller 48 may be programmed to emit no signal, or to emit a no-bypass signal which is indicative of normal operation of the filter 20.

If the filter 20 becomes partially or fully blocked, the fluid 11 will accumulate in the wet portion 28A. If enough fluid 11 accumulates in the wet portion 28A, it may be an indication that a bypass of the filter 20 is imminent or impending. As the fluid pressure increases in the wet portion 28A to an amount indicative of an impending bypass, the pressure differential across the piston head 34A will cause the piston 34 to displace in the direction D1. This will in turn displace the magnet 40 to the second position that is indicative of an impending bypass of the filter 20. The change in the current C flowing through the magnetic sensor 38 caused by the displacement of the magnet 40 will cause the controller 48 to emit the impending bypass signal.

If the filter 20 is not repaired or replaced and becomes more blocked, it may be desirable for the fluid 11 to bypass the filter 20 in order to maintain operation of components downstream of the fluid filter system 10. Thus, in an embodiment, the IBI 22 itself allows the fluid 11 to bypass the filter 20 via fluid outlet 26, in addition to warning of the bypass of the filter 20. In other embodiments, the bypassing of the filter 20 occurs separately from the IBI 22, for instance via alternative bypass line 14C and valve 32 shown in FIG. 1.

During normal or unblocked operation of the filter 20, the piston head 34A is maintained in its first or initial position by the first housing magnet 52 imparting a magnetic force onto the piston magnet 50. If the filter 20 is blocked, the fluid 11 accumulates in the wet portion 28B such that the fluid pressure acting against the piston head 34A (by way of the diaphragm 36) overcomes both the biasing force of the biasing element 56 and the magnetic force between the first housing magnet 52 and the piston magnet 50, thereby displacing the piston head 34A in the direction D1 towards the second position and causing the controller 48 to emit the impending bypass signal, as detailed above. The piston head 34A is then held in the second position by way of the magnetic force between the second housing magnet 54 and the piston magnet 50 until the electromagnetic coil 58 is activated, at which point the biasing element 56 biases the piston head 34A back to the first or initial position.

Figure 3:
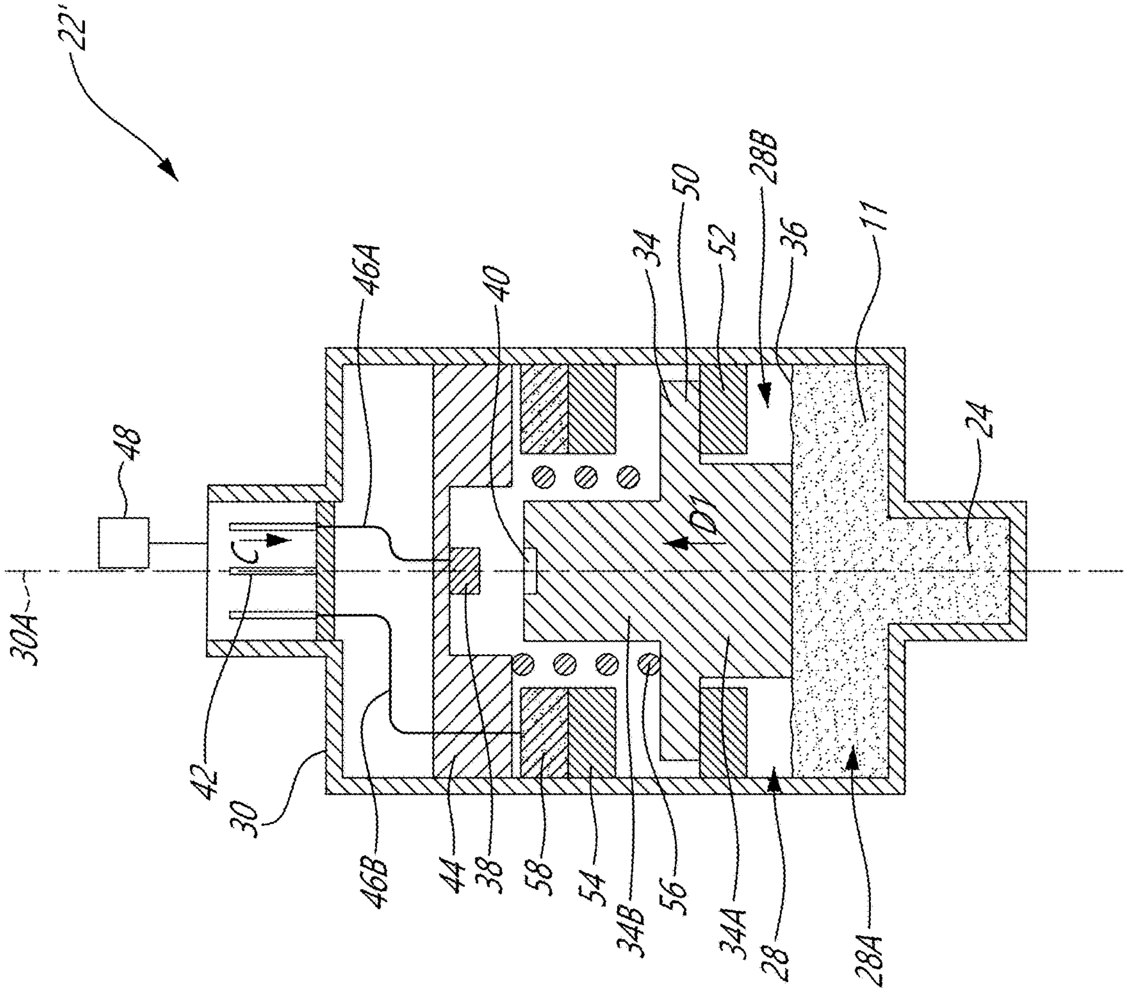
FIG. 3 is schematic, partial cross-sectional view showing the impending bypass switch for the fluid filter system of FIG. 1, according to another embodiment.

Referring to FIG. 3, another embodiment of an IBI 22' is shown. Unless otherwise specified, like reference numerals refer to like elements. The IBI 22' of FIG. 3 operates in a similar manner to the IBI 22 of FIG. 2, with certain differences discussed below. In the shown case, the IBI 22' omits the fluid outlet 26. Instead, and with reference to FIG. 1, the fluid filter system 10 includes alternative bypass line 14C and valve 32 for bypassing the flow of the fluid 11 around the filter 20. Illustratively, the alternate bypass line 14C is in parallel with the filter 20 and IBI 22' along the fluid line 14. Various types of valve 32 may be contemplated. In some embodiments, the valve 32 is electrically coupled to the controller 48 and activatable or actuatable upon receiving the impending bypass signal. In other cases, the valve 32 is manually activatable by a user upon the IBI 22' generating the impending bypass signal. The IBI 22' shown in FIG. 3 is therefore adapted to signal an impending bypass of the filter 20 without performing the bypassing function, as this is carried out by a separate component (e.g., valve 32). Other bypass configurations distinct from IBI 22' may be contemplated.

Figure 4:
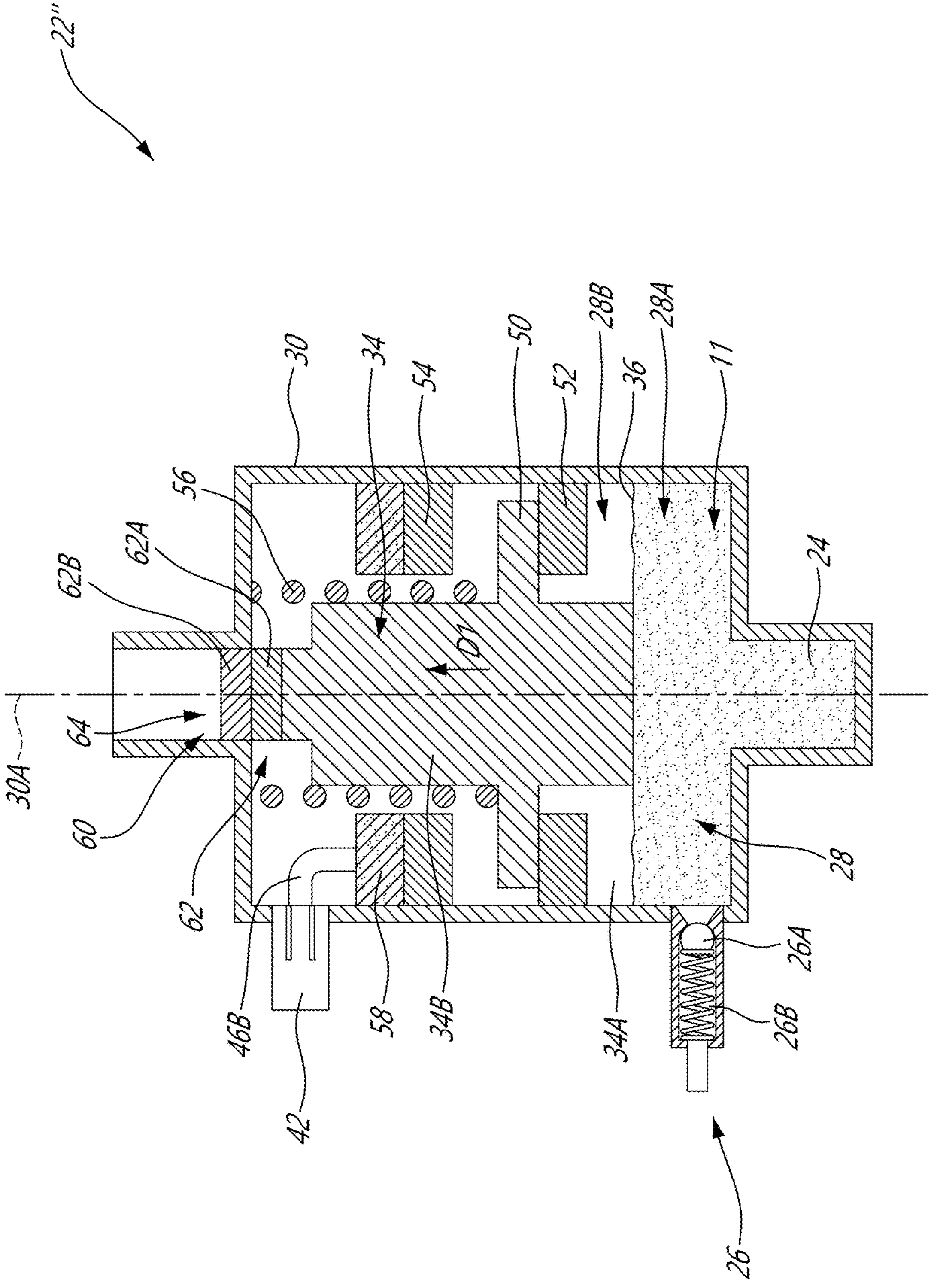
FIG. 4 is schematic, partial cross-sectional view showing the impending bypass switch for the fluid filter system of FIG. 1, according to an embodiment.

Referring now to FIG. 4, another embodiment of an IBI 22" is shown. Unless otherwise specified, like reference numerals refer to like elements. The IBI 22" of FIG. 4 operates in a similar manner to the IBI of FIG. 2, with certain differences discussed below. In the shown case, the IBI 22" omits the magnetic sensor element 38 and magnet 40 provided in the IBIs 22, 22', and instead includes a visual indicator 60 for displaying a visual indication of an impending bypass of the filter 20. For instance, in the shown embodiment, a portion of the piston rod 34B contains an identifier 62 (e.g., a colour distinct from the remainder of the piston rod 34B). Upon displacement of the piston head 34A towards the second position indicative of an impending bypass, the identifier 62 is displaced towards an indication area or display 64 (e.g., a window). As such, a user can be alerted to the impending bypass upon visually inspecting the indication area 64 and viewing the identifier 62. In the shown embodiment, the identifier includes a first colour 62*a* indicative of the non-activated state of the IBI 22" (i.e., normal operation of the filter 20) and a second colour 62*b* indicative of the activated state of the IBI 22" (i.e., signaling an impending bypass of the filter 20). In some embodiments, the IBI 22" includes a fluid outlet 26 so that the IBI 22" both signifies the impending bypass and performs the bypass itself, as was the case with IBI 22 of FIG. 2. In other cases, the IBI 22" strictly signifies of the impending bypass, with the actual bypassing performed by another component (e.g., alternate fluid line 14C and valve 32 of FIG. 1). In such cases, a user, upon being alerted by the IBI 22" of the impending bypass, can manually engage a bypass component such as valve 32. Other non-magnetic alerts for IBI 22" may be contemplated.

Figure 5:
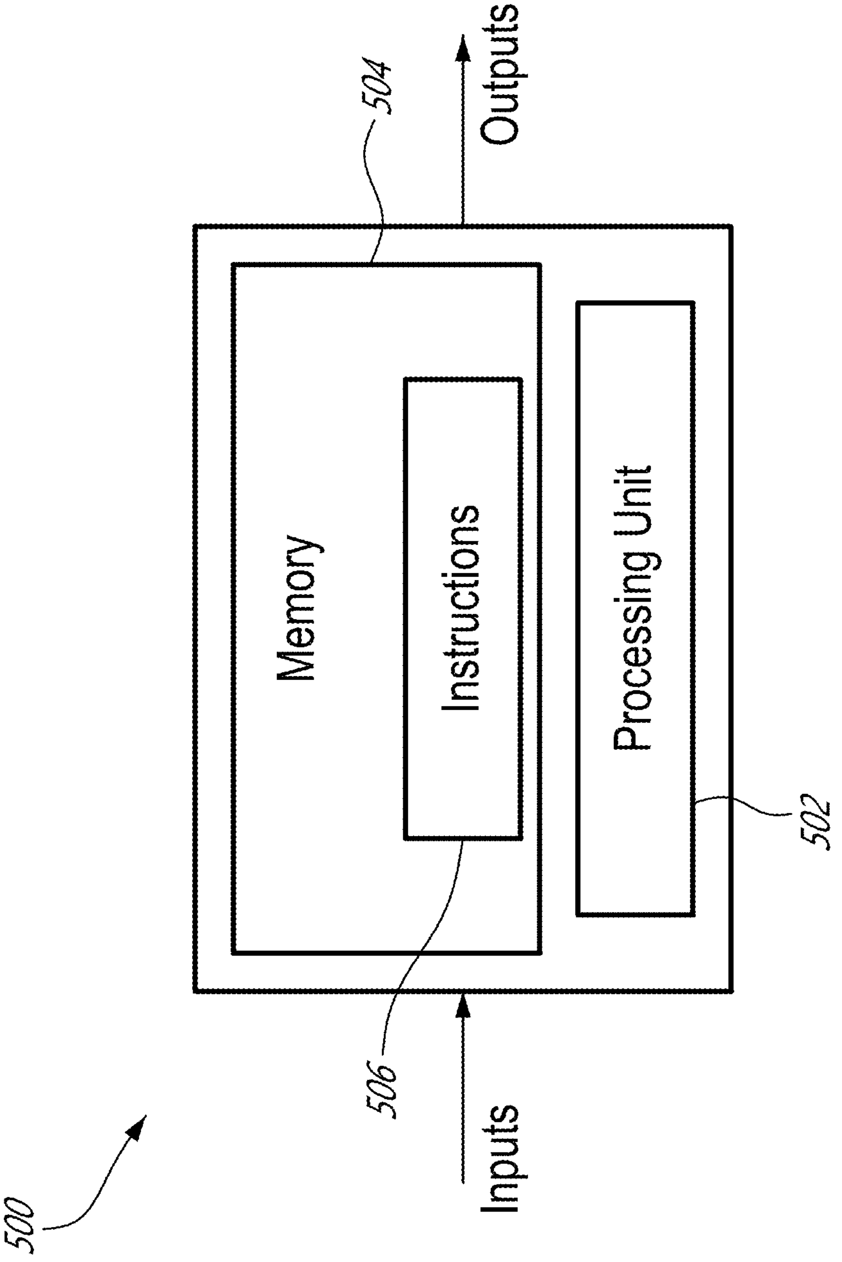
FIG. 5 is a schematic representation of a computing device.

Referring to FIG. 5, an example of a computing device 500 is illustrated for use with IBI 22, 22', 22". For simplicity, only one computing device 500 is shown; it should nevertheless be understood that multiple computing devices 500 operable to exchange data may be employed, as appropriate. In addition, for simplicity, computing device 500 will be described I the context of IBI 22; it should nonetheless be understood that the operations described are also applicable to IBI's 22' and 22", where appropriate. The computing devices 500 may be the same or different types of devices. The controller 48, as well as one or more other portions of the IBI 22 may be implemented, in whole or in part, using one or more computing devices 500. The controller 48 and/or other portions of the IBI 22 may be implemented using physical computing devices, distributed computing devices, virtual computing devices (i.e., implemented within one or more virtual machines), or any suitable combination thereof.

The computing device 500 comprises a processing unit 502 and a memory 504 which has stored therein computer-executable instructions 506. The processing unit 502 may comprise any suitable devices configured to implement the functionality now described, in particular the emission of the impending bypass signal, such that the instructions 506, when executed by the computing device 500 or other programmable apparatus, may cause the functions/acts/steps described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Referring to FIG. 5, and as explained above, the processing unit 502 executes the instructions 506 to emit the impending bypass signal. The computing device 500 operates to receive inputs, such as the current C, or the Hall voltage in the embodiment where the magnetic sensor 38 is the Hall effect sensor. The computing device 500 is thus communicatively coupled to the magnetic sensor 38 in any suitable manner. The computing device 500 operates to monitor and/or measure the change in current C or Hall voltage. It is therefore possible for the controller 48 to monitor the magnetic sensor 38 to identify changes in the current C that are indicative of an impending bypass of the filter 20. The computing device 500 may employ transistors, amplifiers or other devices to process the current C received from the magnetic sensor 38. The current C may then be compared to current values stored in the memory 504, and the instructions 506 may be executed by the processing unit 502 to determine if the current C received from the magnetic sensor 38 is different from the stored current values, exceeds a threshold current value, and/or is different from a previous current value stored in the memory 504, thereby indicating that the change in the current C is indicative of an impending bypass. The processing unit 502 then commands the instructions 506 to emit the impending bypass signal. The processing unit 502 is further configured for commanding the instructions 506 to emit a signal to activate the magnetic coil 58 when it is desired to transition the IBI 22' from the second position to the first position of the piston 50, as described above.

The impending bypass signal is processed by a control system or other computing device. The impending bypass signal may contain information about the impending bypass, such as the percent blockage of the filter 20, the number of cycles remaining before bypass occurs, or the estimated time remaining before the bypass occurs. The control system may process the impending bypass signal to provide this information, which may allow a technician to inspect, repair, or replace the filter 20 prior to bypass occurring. The information provided by the control system may be in any suitable audiovisual form, such as an alter including, but not limited to, a noise, a light, and/or an icon.

The perturbation or change in the current through the magnetic sensor 38 caused by the close presence of the magnet 40 can be processed or analyzed away from the moving parts of the IBI 22. For example, and referring to FIG. 2, the change in the current C may be detected or measured within or outside of the stationary housing 30, to thereby indicate that a bypass of the filter 20 is imminent or impending. The change in the current C may be amplified or filtered by the computing device 500 to remove noise or other undesirable information, such that the resulting information is emitted as the impending bypass signal.

According to the present disclosure, there is provided an exemplary method for signalling an impending bypass of a filter 20. An impending bypass indicator (IBI) 22 is activated by releasing a piston 34 in the IBI 22 from an inactive position, the activating including electrifying a magnetic coil 58 in the IBI 22 to oppose a magnet 54 retaining the piston 34 in the inactive position. The piston 34 is biased from the inactive position to an active position. A fluid 11 is flowed into an interior 28 of the IBI 22, the piston 34 displacing towards the inactive position due to fluid pressure build up caused by a blockage of the filter 20.

The IBI's 22, 22', 22" discussed in the present disclosure may be more reliable than previously used switches, which often included microswitches that were at risk for undetectable faults or false warnings due engine vibrations, for instance. As such, the herein disclosed IBI's 22, 22', 22" advantageously provide fewer moving components susceptible to such vibrations and may therefore more reliably indicate an impending bypass of a component such as a fluid filter.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An impending bypass indicator (IBI), comprising:

a housing having a fluid inlet for admitting a fluid into an interior of the housing;

a piston displaceable in the interior of the housing in response to a pressure variation of the fluid in the interior, the piston displaceable between a first position and a second position spaced apart from the first position, a piston magnet coupled to the piston;

an indicator indicating an impending bypass of a component in response to the piston being in the second position;

a housing magnet in the housing, the housing magnet engaging the piston magnet in the second position of the piston, the housing magnet generating a magnetic force acting on the piston magnet;

a biasing element biasing the piston towards the first position with a biasing force inferior to the magnetic force; and an electromagnetic coil disposed adjacent the housing magnet, the electromagnetic coil selectively electrifiable to generate a second magnetic force opposite to the magnetic force imparted by the housing magnet to allow the biasing element to bias the piston towards the first position.

2. The IBI as defined in claim 1, further comprising an additional housing magnet in the housing, the additional housing magnet engaging the piston magnet in the first position of the piston, the additional housing magnet generating an additional magnetic force acting on the piston magnet to retain the piston in the first position until the pressure variation of the fluid in the interior increases to a magnitude indicative of the impending bypass of the component.

3. The IBI as defined in claim 1, further comprising a magnetic sensor configured to receive a current and fixedly mounted to the housing, and an indicator magnet mounted to the piston to be displaced with the piston, displacement of the indicator magnet relative to the magnetic sensor causing a change in the current through the magnetic sensor, the change in the current indicative of the impending bypass of the component.

4. The IBI as defined in claim 3, wherein the magnetic sensor is a Hall effect sensor.

5. The IBI as defined in claim 3, wherein the magnetic sensor is a magnetoresistive sensor.

6. The IBI as defined in claim 1, wherein the housing further includes a fluid outlet for evacuating the fluid from the interior of the housing to bypass the component.

7. The IBI as defined in claim 1, further comprising a visual indicator including a display through the housing and a visual indication coupled to and displaceable with the piston, the visual indication positioned in the display upon the piston displacing to the second position to visually indicate the impending bypass of the component.

8. The IBI as defined in claim 1, wherein the housing includes a diaphragm fluidly sealing a wet portion of the interior from a dry portion, the diaphragm engaging the piston to displace the piston in response to the pressure variation of the fluid.

9. The IBI as defined in claim 1, wherein the biasing element is a spring and the biasing force is a spring force biasing the piston towards the first position.

10. A fluid filter system, comprising:

a fluid line for conveying a fluid under pressure to a fluid filter;

an impending bypass indicator (IBI), comprising:

a housing having a fluid inlet for admitting a fluid into an interior of the housing;

a piston displaceable in the interior of the housing in response to a pressure variation of the fluid in the interior, the piston displaceable between a first position and a second position spaced apart from the first position, a piston magnet coupled to the piston;

an indicator indicating an impending bypass of the fluid filter in response to the piston being in the second position;

a housing magnet in the housing, the housing magnet engaging the piston magnet in the second position of the piston, the housing magnet generating a magnetic force acting on the piston magnet;

a biasing element biasing the piston towards the first position with a biasing force inferior to the magnetic force; and an electromagnetic coil disposed adjacent the housing magnet, the electromagnetic coil selectively electrifiable to generate a second magnetic force opposite to the magnetic force imparted by the housing magnet to allow the biasing element to bias the piston towards the first position.

11. The fluid filter system as defined in claim 10, further comprising an additional housing magnet in the housing, the additional housing magnet engaging the piston magnet in the first position of the piston, the additional housing magnet generating an additional magnetic force acting on the piston magnet to retain the piston in the first position until the pressure variation of the fluid in the interior increases to a magnitude indicative of the impending bypass of the fluid filter.

12. The fluid filter system as defined in claim 10, wherein the indicator includes a magnetic sensor configured to receive a current and fixedly mounted to the housing, and an indicator magnet mounted to the piston to be displaced with the piston, displacement of the indicator magnet relative to the magnetic sensor causing a change in the current through the magnetic sensor, the change in the current indicative of the impending bypass of the fluid filter.

13. The fluid filter system as defined in claim 12, wherein the magnetic sensor is a Hall effect sensor.

14. The fluid filter system as defined in claim 12, wherein the magnetic sensor is a magnetoresistive sensor.

15. The fluid filter system as defined in claim 10, wherein the housing further includes a fluid outlet for evacuating the fluid from the interior of the housing to bypass the fluid filter.

16. The fluid filter system as defined in claim 10, wherein the indicator includes a visual indicator including a display through the housing and a visual indication coupled to and displaceable with the piston, the visual indication positioned in the display upon the piston displacing to the second position to visually indicate the impending bypass of the fluid filter.

17. The fluid filter system as defined in claim 10, wherein the housing includes a diaphragm fluidly sealing a wet portion of the interior from a dry portion, the diaphragm engaging the piston to displace the piston in response to the pressure variation of the fluid.

18. The fluid filter system as defined in claim 10, wherein the biasing element is a spring and the biasing force is a spring force biasing the piston towards the first position.

19. The fluid filter system as defined in claim 10, further comprising a bypass line in the fluid line, the bypass line including a valve, the valve actuated upon receipt of a bypass signal from the IBI indicative of the impending bypass of the fluid filter to create a bypass of the fluid filter in the fluid line.

* * * * *